(12) United States Patent
Kitchener et al.

(10) Patent No.: US 8,867,184 B2
(45) Date of Patent: Oct. 21, 2014

(54) ELECTRICAL CIRCUIT WITH REDUNDANT TRUNK

(75) Inventors: Renato Kitchener, West Sussex (GB); Gunther Rogoll, Mannheim (DE)

(73) Assignee: Pepperl + Fuchs GmbH (DE)

( * ) Notice: Subject to any disclaimer, the term of this patent is extended or adjusted under 35 U.S.C. 154(b) by 293 days.

(21) Appl. No.: 13/146,091

(22) PCT Filed: Jan. 28, 2010

(86) PCT No.: PCT/GB2010/000136
§ 371 (c)(1),
(2), (4) Date: Jul. 25, 2011

(87) PCT Pub. No.: WO2010/086606
PCT Pub. Date: Aug. 5, 2010

(65) Prior Publication Data
US 2011/0279939 A1    Nov. 17, 2011

(30) Foreign Application Priority Data

Jan. 28, 2009 (GB) ..................................... 0901376.4
Feb. 25, 2009 (GB) ..................................... 0903195.6

(51) Int. Cl.
*H02H 3/00* (2006.01)
*H02H 7/00* (2006.01)
*G06F 1/30* (2006.01)
*H02J 1/10* (2006.01)

(52) U.S. Cl.
CPC .... *H02J 1/10* (2013.01); *G06F 1/30* (2013.01)
USPC ............................................................. 361/63

(58) Field of Classification Search
USPC ............................................................. 361/63
See application file for complete search history.

(56) References Cited

U.S. PATENT DOCUMENTS

| | | | | |
|---|---|---|---|---|
| 7,505,819 B2 * | 3/2009 | El-Sayed | ......................... | 700/21 |
| 7,797,061 B2 * | 9/2010 | El-Sayed | ......................... | 700/21 |
| 7,930,042 B2 * | 4/2011 | El-Sayed | ......................... | 700/21 |

* cited by examiner

*Primary Examiner* — Jared Fureman
*Assistant Examiner* — Lucy Thomas
(74) *Attorney, Agent, or Firm* — Lerner, David, Littenberg, Krumholz & Mentlik, LLP

(57) ABSTRACT

An electrical circuit comprising a power supply, a load, first and second trunks disposed therebetween and control means adapted to control the electrical status of the first and second trunks, in which the control means comprises monitoring means adapted to monitor the current and/or voltage of the first and second trunks and to detect current and/or voltage events which are indicative of faults occurring thereon, and isolation means adapted to isolate the first or second trunk when the monitoring means detects a current and/or voltage event which is indicative of a fault occurring thereon, in which the first and second trunks are electrically connected and arranged in parallel such that the power supplied to the load is distributed substantially equally between them, and in which the control means comprises compensation means adapted to prevent the isolation means from isolating one of said first or second trunks when a current and/or voltage event which is indicative of a fault occurs thereon which is caused by a fault occurring on the other of the first or second trunks.

17 Claims, 10 Drawing Sheets

ELECTRICAL CIRCUIT WITH REDUNDANT TRUNK

CROSS-REFERENCE TO RELATED APPLICATIONS

The present application is a national phase entry under 35 U.S.C. §371 of International Application No. PCT/GB2010/000136, filed Jan. 28, 2010, published in English, which claims the benefit of Great Britain Application No. 0901376.4, filed Jan. 28, 2009 and Great Britain Application No. 0903195.6, filed Feb. 25, 2009. The disclosures of said applications are incorporated by reference herein.

The present invention relates to an electrical circuit with a redundant trunk, for use particularly, but not exclusively, in a Fieldbus communications circuit.

Fieldbus (or field bus) is the name of a family of industrial computer network protocols used for real-time distributed control, now standardized as IEC 61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the Fieldbus which links the PLCs to the components which actually do the work such as sensors, actuators, electric motors, console lights, switches, valves and contactors.

Fieldbus is often used in Intrinsically Safe environments, for example combustible atmospheres, and in particular gas group classification IIC, Hydrogen and Acetylene, and below, for example gas group IIB and IIA, for gas and/or dust. Using the Fieldbus protocol, field instruments and equipment in such an environment are controlled and monitored remotely via an electrical communications circuit often provided in the same electrical circuit as the power to drive the field instruments.

Redundancy is advantageous any electrical system, because it provides means to continue operations in the event of a fault. Redundancy is known in the area of Fieldbus networks, and FIG. 1 shows a typical prior art arrangement. FIG. 1 illustrates a classic redundant Fieldbus power supply 1 and host 2, which are connected via an OR diode 3 to a simplex Fieldbus trunk 4 supplying a device coupler 5. Terminators 6 and 7 are provided at either end of the trunk 4. In this example if one of the power supplies 1 fails, then the other will take over the full supply of power to the device coupler 5. However, if a failure occurs on the trunk 4, for example an open circuit or a short circuit, then the coupler 5 will be cut off from any power source.

The Fieldbus standard IEC 61158 does not support trunk redundancy, which is to say the use of a second trunk to be employed if the first fails. Such an arrangement would not be practical within an Intrinsically Safe environment, but it would find application between the HMI and the Intrinsically Safe section of a Fieldbus infrastructure. There is now therefore demand for such trunk redundancy because its increased capacity to deal with faults would be advantageous. A number of attempts have been made to provide such a solution.

For example, EP1819028, in the name of Moore Industries International Inc., discloses a redundant Fieldbus system including two independent conditioned power modules which automatically detect cable faults, such as short or open circuits on both the host and field sides of the network. The power modules are interfaced directly on one side to the primary and backup H1 cards of the host system, and are directly interfaced on the other side to an automatically terminating network device coupler module which provides connections to field devices. The redundant Fieldbus system provides power and communications in a parallel physical configuration between the host system and the field devices irrespective of any single point failure in the network. In case of a fault, the redundant Fieldbus system automatically eliminates the faulty section of the network, switches power and communications to the healthy portion of the network and terminates the network for signal integrity.

The circuits disclosed in EP1819028 employ a single trunk formed into a "U" type topology. In other words, the single trunk is provided with power supplies at each end, and the field side device coupler is at the centre of the trunk. As such, redundancy is achieved by dividing a single trunk into two operative parts which are only physically parallel in use, and not electrically parallel. This arrangement has the advantages of relative simplicity, and also that only simplex fault detection is required because any fault will have the identical effect on each of the two sections.

However, single ended 'U' topologies like this do have inherent problems, and one in particular is how to provide effective field side termination when one of the trunk sections is isolated upon the detection of a single point of failure. EP1819028 is directed to solving this problem by introducing suitably directed termination at the field side coupler when one of the trunk sections is isolated.

FIG. 2 illustrates how EP1819028 rearranges the topology shown in FIG. 1. (Where the same components appear in FIGS. 1 and 2, the same reference numerals have been used) The circuit shown in FIG. 2 comprises a redundant trunk configuration with the trunk formed into a "U" made up of the two sections 4a and 4b. Each section has an OR diode 3, and each end of the trunk has a terminator 6. If section 4a is cut in use, then the corresponding diode 3 stops conducting, and full power is then redirected through the remaining trunk section 4b. The problem then arises that the trunk section 4b is not properly terminated at the field side. To combat this problem, the voltage of each trunk section 4a and 4b is monitored, and if a drop in voltage is detected upstream of the OR diode arrangement 3, an auxiliary terminator 8 is switched at 9 into a common point of the two sections 4a and 4b, which may be integrated within the device coupler 5.

However, EP1819028 is only concerned with total failures in the two trunk sections 4a and 4b, for example clean short or open circuits which result in a definite transition from healthy to faulty. This is because this document is only really directed to the problems associated with termination and does not deal with other fault scenarios. Therefore, this prior art provides no means for effectively dealing with intermittent faults, which are far more common in practice, for example a fracture due to corrosion, a loose terminal or connection, vibration, or thermal cycling/phase transitions. These type of intermittent faults cause "clatter" on a trunk, which disrupts communications telegrams and leads swiftly to automatic segment shutdown. The circuits shown in EP1819028 do not provide redundancy in the event of such faults. In fact, if such faults were to occur in a circuit like that shown in FIG. 2, one of the trunk sections 4a or 4b would be intermittently switched in and out, and the auxiliary terminator 8 would be intermittently switched in and out in concert. This would lead to the voltage at the device coupler stepping up/down as well due to the cable copper loss/gain. All of these factors would result in severe communication disruption and failure.

Another point to note with the circuit in EP1819028 is that the two sections of the trunk are both fully operational when no faults are detected, but they are connected to independent power supplies (and communications sources) at the host end.

This arrangement would cause load sharing problems and communications issues, and in addition, when one trunk is isolated in use, the associated power supply and host are also removed from the circuit, eliminating the redundancy of these components.

Yet another problem is that when one trunk is isolated upon the detection of a fault, it is only isolated at one end, leaving an un-terminated length of trunk connected to the circuit which would cause significant communication signal degradation, in particular if the trunk was long, for example 1 km. FIG. 2a illustrates the issue. In FIG. 2a, line I represents a signal wave at the end of a single 1 km long trunk cable. Line III represents the same signal wave at the end of a dual 1 km trunk cable, and as is clear from FIG. 2a there is slight attenuation and HF filtering of the signal, which is not a significant problem. However, line II in FIG. 2a represents the same signal wave sent down a dual 1 km trunk cable in which one trunk has been isolated at just one end. There is significant reflection and distortion, and this would cause a problem.

Another disadvantage of the circuit in EP1819028 is that some parts are shared by the two trunk sections, for example the auxiliary terminator 8, which results in a reduced degree of redundancy because failure of a common part would cause the entire system to fail.

WO2005/053221, and EP1847894, both in the name of Siemens, disclose similar electrical circuits to those shown in EP1819028 described above, and they feature all the same advantages and disadvantages.

WO2008044657, in the name of Yokogawa Electric Corp et al, also discloses a form of redundant trunk arrangement, but in this case there is a redundant network system comprising trunk lines formed as multiplexed networks. Trunk line switching apparatuses disposed at the two ends of each trunk line select a trunk line to be used for connection to communication stations. If an abnormality is detected on a trunk line being used, the switching apparatus switches from that trunk line to another one. A difference between the circuit in WO2008044657 and those described above is that only one trunk is used at any one time. As such, the trunk redundancy is provided in the most simple way by providing one or more spare trunks, which are not electrically connected or associated with the first trunk in any real way. As a result, there is no dual provision as such which can provide substantially continuous power and communications when one part fails and is isolated. In addition, as above there is only disclosed a very simple fault detection and isolation system which is not capable of dealing efficiently with intermittent faults of the type described above.

All of the prior art circuits rely on current increase and decrease for fault detection, and in each case the inductance or reactance of the power supply will choke the current flow when a fault occurs, which introduces a delay between the point of the fault occurrence and the isolation of the fault. This is more troublesome for short circuits, because a loss of voltage occurs whilst the current demand is taken up. This is a major problem, because the length of the delay is more than sufficient to starve field devices of energy and cause device "brown out". This is a phenomenon in which a device fails not due to full power loss (black out), but due to a disruption in the supply of power long enough to prevent continuous normal operation, which leads to a device failing despite still being powered. The circuits shown in the prior art have no means to deal with this problem, and as such field devices would fail in the event of a fault and require re-setting or re-starting.

The present invention is intended to overcome some of the above problems.

Therefore, according to the present invention an electrical circuit comprises a power supply, a load, first and second trunks disposed therebetween and control means adapted to control the electrical status of the first and second trunks, in which the control means comprises monitoring means adapted to monitor the current and/or voltage of the first and second trunks and to detect current and/or voltage events which are indicative of faults occurring thereon, and isolation means adapted to isolate the first or second trunk when the monitoring means detects a current and/or voltage event which is indicative of a fault occurring thereon, in which the first and second trunks are electrically connected and arranged in parallel such that the power supplied to the load is distributed substantially equally between them, and in which the control means comprises compensation means adapted to prevent the isolation means from isolating one of said first or second trunks when a current and/or voltage event which is indicative of a fault occurs thereon which is caused by a fault occurring on the other of the first or second trunks.

Thus, the present invention provides an electrical circuit with true trunk redundancy, as the first and second trunks are electrically connected in parallel between a common power supply and the load. In this arrangement the first and second trunks more or less share the energy flowing into the load, and both provide the same communications between a host system and the field devices.

This arrangement has a number of clear advantages over the prior art. Firstly, as there is a common power supply a single physical layer diagnostics module can monitor the total current in the circuit, as well as signal characteristics, noise levels and the balance to ground of both the first and second trunks.

Secondly, the power supply and the load at each end of the circuit can have fixed termination in the conventional way, which eliminates the problems associated with having a simplex auxiliary switchable terminator like that EP1819028.

In addition, with electrically parallel first and second trunks operating simultaneously, continuous power and communications can be maintained when one trunk is isolated upon the occurrence of a fault. More details on how this can be achieved with the present invention to avoid device brown out are given below.

However, electrically connecting two trunks in parallel according the present invention causes a number of particular problems which need to be overcome for such an arrangement to work in practice. These readily foreseeable problems would be apparent to a person skilled in the art.

The principal problem is that because the first and second trunks are electrically parallel, a fault on one trunk can cause an apparent fault on the other. Known fault detection and trunk isolation systems would react to these two events and isolate both the first and second trunks at the same time. In particular, if a short circuit occurs on the first trunk, this results in current drop on the second trunk as if an open circuit were occurring thereon.

Therefore, as described above, the present invention comprises compensation means adapted to prevent the isolation means from isolating the healthy trunk under such circumstances.

In a preferred construction the monitoring means can comprise a first current sensor disposed on the first trunk and a second current sensor disposed on the second trunk. The control means can comprise circuitry adapted to drive the isolation means to isolate the first or second trunk if the corresponding first or second current sensor detects a current below a low current trip value or above a high current trip value, said low current trip value and said high current trip value being respectively below and above an expected minimum and maximum working current of the load. The compensation means can comprise a first function of the circuitry which prevents said circuitry from driving the isolation means to isolate the first or second trunk if the current thereon reaches said low current trip value as a result of a short circuit on the other of the first or second trunk.

Therefore, the control means can be adapted to differentiate between a genuine open circuit occurring on the first or second trunk, and an apparent open circuit caused by a short circuit on the other of the first or second trunk. There are two different ways that this can be achieved.

In a first embodiment said circuitry can comprise a first autonomous trunk section and a second autonomous trunk section, each of which can comprise a first comparator adapted to compare the current detected by the corresponding current sensor with a low current reference, and a second comparator adapted to compare the current detected by the corresponding current sensor with a high current reference. The first and second comparators can be adapted to drive the isolation means to isolate the first or second trunk if the corresponding current sensor detects a current below or above said low current reference and high current reference respectively. However, the first comparator can be provided with a first delay means adapted to prevent the first comparator from driving the isolation means to isolate the corresponding trunk for a first pre-determined delay period.

An apparent open circuit fault on one trunk caused by a genuine short circuit occurring on the other trunk will only last for as long as the short circuit is permitted to draw sufficient current to cause the apparent open circuit. Therefore, if the short is dealt with quickly the apparent open circuit status will cease and the current will rise back above said low current reference. Therefore, the first pre-determined delay period can be adapted to allow for the short circuit to be dealt with, via isolation or current limiting as described further below, and for the current to then rise back above said low current reference. (To avoid device brown out the short circuit has to be dealt with very quickly because the choking of the current on the healthy trunk starves the field devices of power. The manner in which this is done is explained further below.)

The first pre-determined delay period also has a second advantage. An apparent open circuit fault on one trunk can also be caused by the disconnection of a load but the continuation of a trickle current. This could occur if a coupler were disconnected but a slave switch were left on, resulting in cable back emf. Again, this apparent open circuit will only last for a certain length of time, and the first pre-determined delay can be sufficient to accommodate it. (If the reservoir feature described below were also used as a sink, the duration of this trickle current could be curtailed.)

The use of a delay like this allows for the first and second sections of the circuitry to be autonomous from one another. This is advantageous because it eliminates any possible common points of failure from the system.

Another circumstance in which an apparent fault needs to be ignored is when a load is attached and draws an indeterminate inrush current, which is higher than said high current reference. This must be allowed to happen without triggering trunk isolation. An increase in current like this will be equal in both the first and second trunks, so if the monitoring and isolation means are interlinked events like this can be recognised and ignored (see below). However, when the first and second sections of the circuitry are autonomous as described above, another approach is required.

Therefore, the second comparator can be provided with a second delay means adapted to prevent the second comparator from driving the isolation means to isolate the corresponding trunk for a second pre-determined delay period.

This second pre-determined delay period can be sufficient to allow for the periods of inrush current which would occur in the circuit in question. For example, the second pre-determined delay period can be 500 us.

However, providing this second pre-determined delay period causes a problem. The circuit of the present invention has a common power supply point, and it is necessary for safety reasons to provide the common power supply with a high current trip. If a genuine short circuit occurs on one of the first or second trunks, the current thereon would be sufficient to reach said high current trip during said second pre-determined delay period. If said high current trip were reached then the power supply to both the first and second trunks would be cut off.

Therefore, the control means can comprise current limiting means adapted to limit the current on the first or second trunk, and the second comparator means can be adapted to drive the current limiting means to limit the current on the corresponding trunk during said second pre-determined delay period.

This arrangement prevents the current on the first or second trunk from reaching the power supply high current trip during a genuine short circuit. Therefore, if the current on the first or second trunk briefly rises above said high current reference as a result of a load being attached, then that trunk will not be isolated thanks to the second pre-determined delay period. However, if a genuine short circuit occurs in the first or second trunk then it will be subjected to rectangular current limiting at first, which prevents shut down of the power supply, before it is then fully isolated.

The second main way that the control means can be adapted to differentiate between a genuine open circuit occurring on the first or second trunk, and an apparent open circuit caused by a short circuit on the other of the first or second trunk, is to actually interlink the monitoring systems of both trunks and provide appropriate overrides.

Therefore, in another embodiment of the invention said circuitry can comprise a first trunk section and a second trunk section, each of which can comprise a first comparator adapted to compare the current detected by the corresponding current sensor with a low current reference, a second comparator adapted to compare the current detected by the corresponding current sensor with a high current reference, and a third comparator adapted to compare the output of the second comparator with a fixed reference. The first and second comparators can be adapted to drive the corresponding isolation means to isolate the first or second trunk if the corresponding current sensor detects a current below or above said low current reference and high current reference respectively. However, the first comparator can be provided with a first override means, and the third comparator of each of the first trunk section and the second trunk section can be adapted to drive the first override means of the other of the first trunk section and the second trunk section if the output of the corresponding second comparator changes.

With this arrangement the control means actively overrides isolation of one trunk if a short circuit occurs on the other trunk. This interlinking between the trunks has the advantage that no delays in the operation are present. With regard to the handling of short circuits like this there are also no common parts.

As described above, a circumstance in which an apparent fault needs to be ignored is when a load is attached and draws an indeterminate inrush current, which is higher than said high current reference. With interlinked monitoring of the trunks events which are equal in both trunks can be recognised and actively handled.

Therefore, an output of the third comparator of both the first trunk section and the second trunk section can be fed to an AND gate, the second comparator can be provided with a second override means, and the AND gate can be adapted to drive the second override means of both the first trunk section and the second trunk section.

Thus, in the event of an increase in current in both the first and second trunks which would reach the high current reference at the same time, no isolation occurs. The second override means can be achieved by driving the high current reference fed to the second comparator upwards to a higher point to allow for the increased current. This increase can be performed for a pre-determined time only, for example 500 us, to allow for inrush current to occur. If the current remained high on both trunks after this period, there would be a problem and isolation would be required.

However a short circuit is dealt with, by current limiting or immediate isolation, this has to occur quickly if device brown out is to be avoided. Typically, if devices are starved of current for more than a few hundred micro seconds, they will suffer from device brown out, or even black out. Therefore, a drop in current in the first or second trunk caused by a short circuit occurring on the other trunk cannot be allowed to continue for more than a few hundred microseconds, and preferably considerably less than that, for example as short a time as 10 us. Therefore, short circuits must be detected and reacted to before device brown out can occur. However, in some circumstances the increase in current caused by a short circuit can take as long as 500 us to reach the high current reference, in particular if the high current reference has been set high above the normal current to provide advantageous tolerance. This problem can be mitigated somewhat by the presence of terminators at each end of the first and second trunk, which can act as current reservoirs which drive the current up at a faster rate in the event of a short circuit. However, it may prove necessary in practice to provide additional current.

Therefore, in one embodiment the electrical circuit can comprise current reservoir means, which in the event of short circuit on the first or second trunk can be adapted to drive the current thereon to said high current trip value in less time than said current would reach said high current trip value in its absence.

The current reservoir means can be provided in several ways, but in one construction it can comprise a diode shunted trickle charge resistor and a capacitor. During normal operation the diode is not in conduction, and the impedance into the capacitor is at the resistance of the trickle charge resistor, which may be several kilo Ohms. During a shorted circuit fault the diode conducts and allow high current levels to flow into the short circuit at a low source impedance from the capacitor. This prevents the short circuit from pulling the power supply output voltage down due to it's internal impedance, and provides, and holds, an instantaneous high current instantaneously which can be detected and reacted to in a fast time.

Another problem to be solved is how to effectively deal with intermittent faults. Without any provision for dealing with these common types of faults, the electrical circuits described above would repeatedly isolate and then reconnect the first or second trunk. This would lead to severe communications disruption, and cause a high level of energy to be dissipated in the current sensor.

Therefore the control means can be adapted to drive the isolation means to isolate the first or second trunk for a first pre-determined time period after the detected current on said first or second trunk reaches said low current trip value or said high current trip value.

With this arrangement, the first or second trunk is isolated as soon as an intermittent fault begins, and that trunk is then held in an isolated state. This prevents a problematic sequence of isolation and reconnection from occurring.

The first pre-determined time period can be indefinite, which is to say that the isolation means isolates the first or second trunk until it is manually or automatically instructed otherwise, or it can be a given period of time suitable to allow for a typical intermittent fault to clear. After the first pre-determined time period the trunk in question will be reconnected, so the length of the first pre-determined time period can be set in accordance with a desired delay before an automatic re-try of the trunk.

Preferably said electrical circuit can be a communications circuit comprising telegrams sent between a host and one or more field devices connected to said electrical circuit. Said field devices can send telegrams to the host in a cycle sequence which lasts for a second pre-determined time period.

In a typical Fieldbus system there can be 16 or 32 field devices, and the cycle sequence of telegrams can last about a second. The first and second trunks of the present invention would handle these telegrams simultaneously in normal operating conditions without difficulty. However, in the event of a fault on the first or second trunk which disrupted a telegram, the equivalent telegram sent on the other trunk would also be disrupted, because the interference would feed into the common part of the circuit.

In the event that a telegram between two devices in the sequence fails, known communications devices will attempt the same telegram again. However, if telegrams fail continuously over a number of cycle sequences then known devices automatically shut down or revert to standby. Generally known devices do this if five successive telegrams are interrupted, and in terms of failure such a shut down can have the same effect as a complete segment failure.

Therefore, the first pre-determined time period can be at least twice the length of the second pre-determined time period. With this arrangement one of the trunks is isolated for long enough to allow at least one uninterrupted telegram cycle sequence to be sent on the healthy trunk before the faulty trunk is reconnected, and has the potential to once again disrupt one or more of the telegrams in the sequence. This prevents any automatic shut down of devices as a result of continuous communications failure, as described above.

However, in order to prevent possible isolation and reconnection every two seconds or so, which would still cause physical problems in the circuit, the first pre-determined time period can be far longer than the second pre-determined time period, for example between 10 seconds and two minutes or longer. This length of time may be sufficient to allow for most common intermittent faults to clear.

In one construction the control means can comprise a manual reconnection, and during said first pre-determined time period manual activation of the manual reconnection reconnects said first or second trunk.

If there is still a fault on the trunk then the control means will isolate it again in the manner described above. This should occur within a period of microseconds, and as such no more than one telegram should be disrupted as a result of a manual re-try. If the fault has cleared, or is dormant, then the trunk will begin to operate normally once again.

This manual reconnection feature allows an operator to test an isolated trunk at any time to check its fault status. As an alternative, or in addition to the manual reconnection, the control means can reconnect said first or second trunk after said first pre-determined time period, as described above. Again, if the trunk is still faulty the control means will isolate it again, quick enough to prevent more than one telegram from being disrupted.

One of the particular problems with the prior art circuits described above is that when one trunk is isolated upon the detection of a fault, it is only isolated at one end, leaving an un-terminated length of trunk connected to the circuit. This would cause significant communication signal degradation, in particular if the trunk was long, for example 1 km, as described above in relation to FIG. 2a.

Therefore, said first and second trunks can comprise a power supply end and a load end, and the isolation means can comprise primary isolation devices disposed at the power supply ends of the first and second trunks, as well as slave isolation devices disposed at the load ends of the first and second trunks.

With this arrangement the first or second trunk is isolated at both ends upon the detection of a fault and effectively removed from the circuit topology, which prevents any un-terminated lengths of trunk causing communications problems.

The primary isolation devices can each comprise a resistive series element adapted to isolate the corresponding trunk from the power supply, and the slave isolation devices can each comprise a diode adapted to isolate the corresponding trunk from the load when the corresponding primary isolation device isolates said trunk from the power supply.

Another communications problem which arises as a result of having a first and second trunk electrically connected in parallel is that there can be an additional attenuation to communications signals. In theory this could limit the possible length of such parallel trunks. However adding a signal repeater within or at the load end coupler would allow the full compliment of spurs and spur lengths, and effectively increase the possible trunk length. For example, a trunk length of approximately 900 meters would be achievable without infringing the requirements of the IEC 61158-2 standard.

In order to function correctly the opposite ends of the electrical circuit of the invention need to be terminated. As referred to above, one of the advantages of the present invention is that such termination can be fixed, because of the common parts of the circuit at opposite ends thereof. This means that there does not need to be any auxiliary switchable terminator like that in EP1819028.

Therefore, in a preferred embodiment of the present invention the electrical circuit can comprise a common power supply end section and a common load end section, and a fixed passive terminator can be provided in said common power supply end section and in said load end section.

Another advantage of having common sections of the circuit is that the total current flowing through the circuit can be sensed. This allows for the low current trip value and the high current trip value to actively track the actual current drawn by the load in use.

Therefore, in one embodiment the monitoring means can further comprise a third current sensor disposed in the common power supply end section, which third current sensor can be adapted to detect a total current in the electrical circuit over time. The control means can be adapted to derive the low current trip value and the high current trip value as functions of said detected total current, which functions track said total current over time.

The functions can simply be a proportion of the detected total current at any point in time, for example 45 percent or 55 percent respectively (ten percent below and above half the total circuit current flowing through each of the first and second trunks). Alternatively the functions can be an integration, amplification or attenuation of the total detected current. By actively adjusting the current trip values they can be far closer in value to the actual current flowing through the first and second trunks at any one time, than if they had to be set at a fixed low and high point about a normal operating range. This means the system can be far more sensitive and can act far faster.

As the electrical circuit of the present invention has a first and second trunk electrically connected in parallel, the current in both the high and low lines of both the first and second trunk has to be measured. This is not the case for any of the prior art arrangements.

Therefore, the first and second trunk can each comprise a high line and a low line, and the first and second current sensors can be adapted to measure the current on both the high and low lines of the corresponding trunk.

It is of course possible to directly sense the current in both the high and low lines of the first and second trunk, however in one version of the invention the current in both the high and low lines can be detected by just one sensor, reducing the component count.

In order to facilitate this the high line and the low line can be connected by a low voltage drop-out circuit, and the first and second current sensors can be disposed on the corresponding low line.

With this arrangement, if an open circuit occurs in the high line the low voltage drop-out circuit will isolate the low line to present an open circuit thereon, which is then detectable by the corresponding current sensor on said low line.

The invention can be performed in various ways, but three embodiments will now be described by way of example, and with reference to the accompanying drawings, in which.

Figure 1:
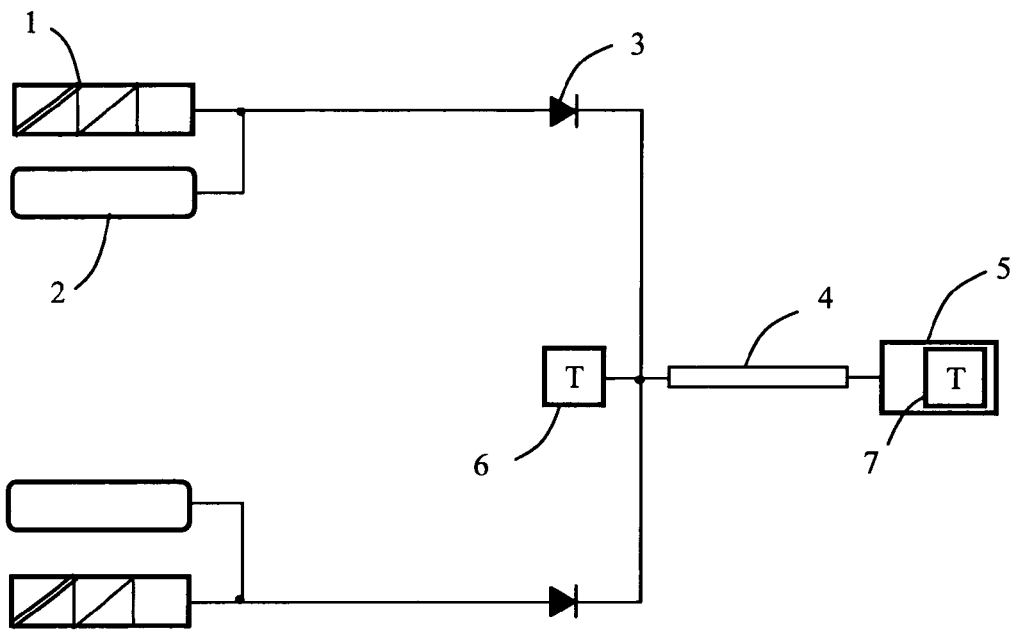
FIG. 1 is a diagrammatic view of a first prior art electrical circuit.
Figure 2:
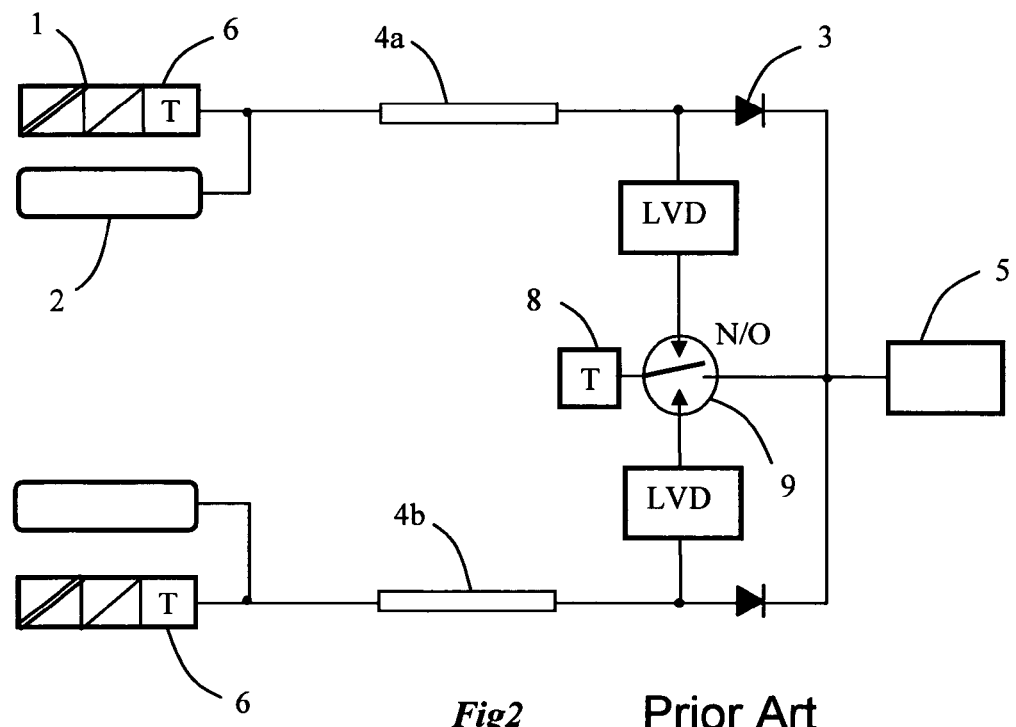
FIG. 2 is a diagrammatic view of a second prior art electrical circuit.
Figure 2A:
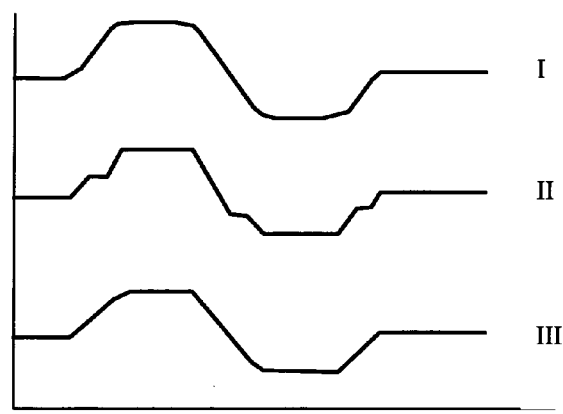
FIG. 2a is a graph showing signals sent on the second prior art electrical circuit shown in FIG. 1.
Figure 3:
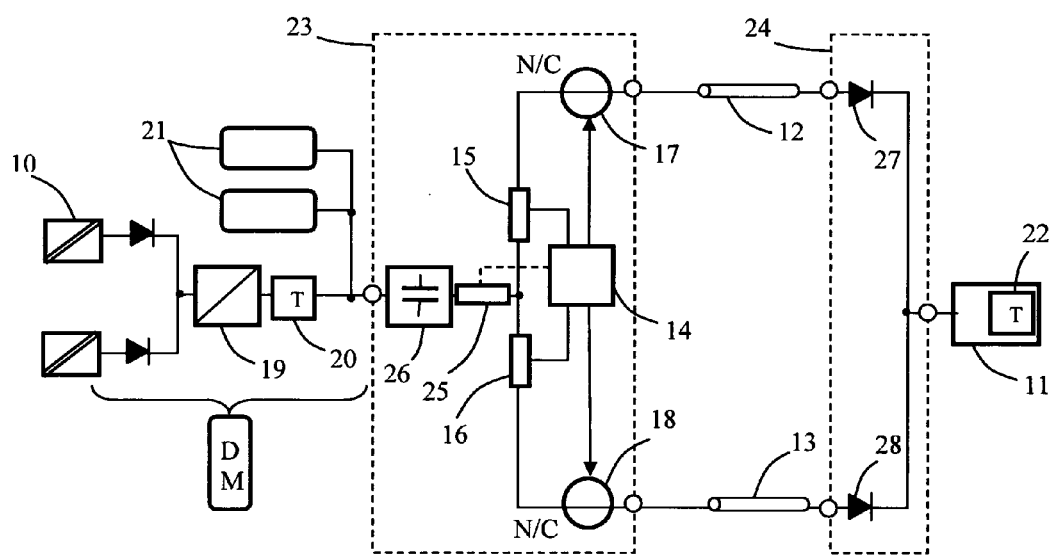
FIG. 3 is a diagrammatic view of an electrical circuit according to the present invention.

As shown in FIG. 3, an electrical circuit comprises a power supply, in the form of redundant power supplies 10, a load, in the form of coupler 11, first and second trunks 12 and 13 disposed therebetween and control means adapted to control the electrical status of the first and second trunks 12 and 13, in the form of control circuit 14.

The control means (14) comprises monitoring means adapted to monitor the current and/or voltage of the first and second trunks 12 and 13 and to detect current and/or voltage events which are indicative of faults occurring thereon, in the form of current sensors 15 and 16. The control means (14) also comprises isolation means adapted to isolate the first or second trunk 12 or 13 when the monitoring means (15 and 16) detects a current and/or voltage event which is indicative of a fault occurring thereon, in the form of resistive series elements 17 and 18.

As is clear from FIG. 3, the first and second trunks 12 and 13 are electrically connected and arranged in parallel such that the power supplied to the load (11) is distributed substantially equally between them.

As described further below, the control means (14) comprises compensation means adapted to prevent the isolation means from isolating one of said first or second trunks 12 or 13 when a current and/or voltage event which is indicative of a fault occurs thereon which is caused by a fault occurring on the other of the first or second trunks 12 or 13.

In other respects the electrical circuit shown in FIG. 3 is a conventional Fieldbus system. There is a classic OR redundant power supply 10, feeding a simplex power conditioner 19 (although this could also be a redundant active power conditioner placed within the two power supplies) and a fixed passive terminator 20, and there is a powered connection for a redundant host system 21. This is all monitored by an integrated diagnostic module DM.

However, the power is routed to the device coupler 11, which has a classic fixed terminator 22, via a supply end circuit 23 and a load end circuit 24. These circuits 23 and 24 route the same power and signal paths along the two physically segregated trunk cables 12 and 13, which are only electrically connected at the two end circuits 23 and 24. Each trunk cable 12 and 13 will more or less share the same quiescent and signal currents due to the resistive nature of the cable and sensing elements, and in part due to the conductive nature of the electronic devices forming a part of the circuit.

At its power supply end each trunk cable 12 and 13 has the respective current sensors 15 and 16, as referred to above. However an additional current sensor 25 is mounted in the common power supply section, which senses the total current in the circuit. The purpose of this is explained further below. In addition, an energy reservoir 26 is included in the common power supply section, the purpose of which is also described further below.

At the load end each trunk cable 12 and 13 is fitted with a diode 27 and 28 respectively, the purpose of which is to fully and automatically isolate the trunk cables 12 and 13 at their load end, when the restive series elements 17 and 18 are opened on detection of a fault. If either of elements 17 or 18 are opened the respective diode 27 or 28 will automatically stop conducting. As such the trunks 12 and 13 are automatically isolated at both ends in the event of a detected fault.

To operate effectively the circuit shown in FIG. 3 must address a number of problems. Firstly, if a short circuit occurs on one of the trunks 12 or 13, the current level on the other will drop, as if there were an open circuit. This problem is exacerbated by the fact that the power supply conditioner 19 will choke the current, and only that from the terminator will flow into the circuit. The compensation means referred to above will act to prevent any isolation of the healthy trunk, but this must happen very quickly otherwise there will be a loss of voltage that would case brown out of the devices fed by the coupler 11. As such, the electrical circuit shown in FIG. 3 must have the ability to react to a short circuit at high speed, for example within the first ten or so microseconds.

Secondly, the attachment of a load will result in a demand for inrush current, and this increase in current will have the same characteristics as a short circuit occurring on both trunks 12 and 13. Isolation of both the trunks 12 and 13 must be prevented in these circumstances.

Thirdly, if an intermittent fault occurs on one of the trunks 12 and 13, the electrical circuit must be able to deal with the situation without allowing a sequence of Fieldbus telegrams to be corrupted, because this can lead to devices being shut down.

As referred to above, there are two basic ways the compensation means of the invention can operate to address the above problems. The first is by using interlinked trunk monitoring systems, and the second is by using autonomous trunk monitoring systems provided with delay overrides.

Figure 4:
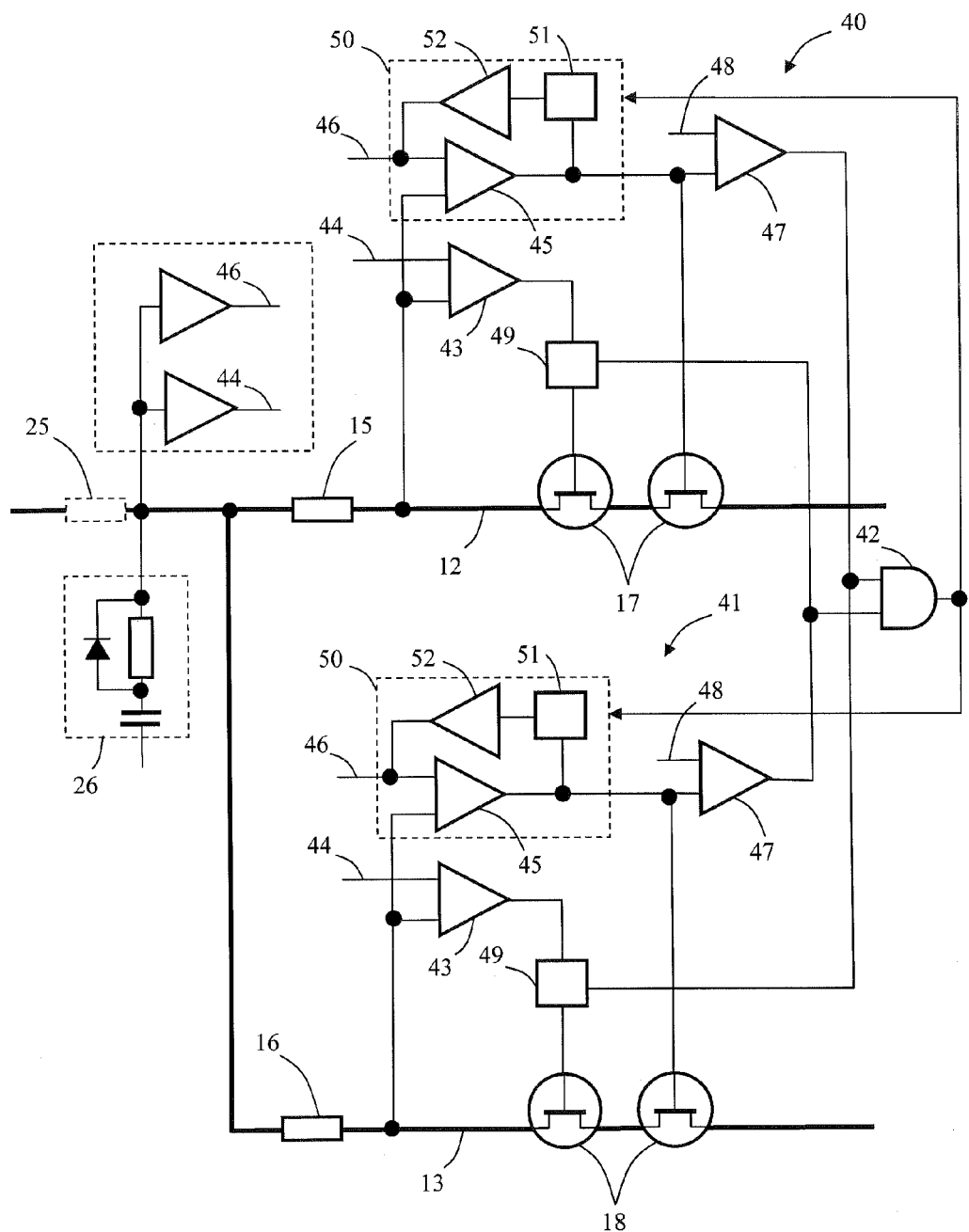
FIG. 4 is a diagrammatic view of part of the electrical circuit as shown in FIG. 3.

FIG. 4 illustrates how the control means 14 can be arranged to operate by interlinking the monitoring and isolating features of both trunks 12 and 13. The control means 14 comprises a first trunk section 40 and a second trunk section 41, which are identical, and one common shared component, AND gate 42.

In each case the current on the trunks 12 and 13 is sensed by resistors 15 and 16 respectively, and in each case the sensed current is fed to a first comparator 43 which compares it with a low current reference feed 44, and to a second comparator 45 which compares it with a high current reference feed 46. The low and high current references 44 and 46 can be fixed set points above and below the maximum and minimum working current range expected of the load. However, in this case the total current in the circuit is sensed by resistor 25, and the low and high current references 44 and 46 are actively derived as functions of said total current. The functions are a proportion of the detected total current at any point in time, for example 45 percent or 55 percent respectively (ten percent below and above half the total circuit current flowing through each of the first and second trunks 12 and 13). By actively adjusting the low and high current references over time, they can be far closer in value to the actual current flowing through the first and second trunks 12 and 13 at any one time, than if they had to be set at a fixed low and high point about a normal operating range. This means the control means 14 benefits from a much tighter trip sensitivity.

FIG. 4 also illustrates that the current reservoir 26 comprises a diode shunted trickle charge resistor and a capacitor. During normal operation the diode is not in conduction, and the impedance into the capacitor is at the resistance of the trickle charge resistor, which may be several kilo Ohms. During a short circuit fault the diode conducts and allow high current levels to flow into the short circuit at a low source impedance from the capacitor. This prevents the short circuit from pulling the power supply output voltage down due to it's internal impedance, and provides, and holds, an instantaneous high current instantaneously which can be detected and reacted to in a fast time.

Outputs of the first comparators 43 are fed to series elements 17 and 18 respectively, and the outputs of the second comparators 45 are also fed to series elements 17 and 18 respectively. (The series elements 17 and 18 are shown as two devices in FIG. 4 for ease of explanation, but in practice there need only be one device.) Therefore, if the current sensed in trunks 12 or 13 reaches the low current reference 44 or the high current reference 46 at any time, the comparators 43 or 45 operate to drive their respective series element 17 or 18, and the trunk 12 or 13 is isolated. As such, action is taken to isolate the trunks 12 and 13 in the event of a short circuit which leads to an increase in current, and in the event of an open circuit which leads to a decrease in current.

However, the control means 14 also has a first override means and a second override means, which act to prevent isolation of one or both of trunks 12 and 13 in particular circumstances. In particular, both the first trunk section 40 and the second trunk section 41 comprise a third comparator 47 which compares the output of the second comparator 46 with a fixed reference 48. The output of the third comparator 47 is fed to an first override function 49 disposed between the first comparator 43 and the series element 17 or 18 of the opposite of the first or second trunk section 40 or 41.

Further, the output of the third comparators 47 is also fed to AND gate 42. The output of the AND gate 42 is fed to a second override function 51 disposed between the second comparator 45 and the series element 17 and 18.

The override function 49 also has another function. Once the first comparator has sent a signal to the series element 17 or 18 to open, the override function 49 holds the series element 17 or 18 open for a first per-determined time period. This prevents the series element 17 or 18 from opening and closing in quick succession in the event of an intermittent fault. This is disabled if a signal is received from the third comparator 47 of the other of the first or second trunk section 40 or 41.

The second override function 51 operates in the same way. Once the second comparator has sent a signal to the series element 17 or 18 to open, the second override function 51 holds the series element 17 or 18 open for said first pre-determined time period. Again, this is disabled if a signal is received from the AND gate 42.

With this arrangement, the first and second trunks 12 and 13 are isolated as soon as an intermittent fault begins, and that trunk is then held in an isolated state. This prevents a problematic sequence of isolation and reconnection from occurring, which would disrupt communications, and heat up in the series elements 17 and 18.

The first pre-determined time period can set as desired, and it can be indefinite, which is to say that the first or second trunk 12 or 13 is isolated until it is manually or automatically reconnected, or it can be a given period of time suitable to allow for a typical intermittent fault to clear. The circuit show in FIG. 4 is a Fieldbus circuit, and the first and second trunks 12 and 13 handle telegram cycle sequences containing communications signals sent between the host 21 and devices in the field. Each of these cycles lasts about a second.

If successive numbers of telegrams are interrupted in use this can lead to automatic shut down of devices. This would happen if the circuit reacted to intermittent faults by repeatedly isolating and reconnecting one of the trunks 12 or 13. As such, the first pre-determined time period needs to be at least twice the length of one telegram cycle sequence, so that at least one uninterrupted telegram cycle sequence can be sent on the healthy trunk before the faulty trunk is reconnected. However, in practice it is preferably to hold the isolated state for between about 10 seconds and two minutes or longer, because this length of time may be sufficient to allow for most common intermittent faults to clear.

The circuit in FIG. 4 has a manual reconnection function (not shown), to allow for a user to test the trunks 12 and 13 if they are isolated. If there is still a fault on the trunk 12 or 13 then it will be detected immediately and that trunk will be isolated once again in the manner described above. This should occur within a period of microseconds, and as such no more than one telegram should be disrupted as a result of a manual re-try. If the fault has cleared, or is dormant, then that trunk will begin to operate normally once again.

Therefore, if a short circuit occurs on trunk 12 the current thereon will increase immediately, according to the capacity of the terminator 25 and the reservoir 26. Within the first 10 us or so the current will reach the high current reference 46, and as a result the second comparator 45 will output a signal to open the series element 17 to isolate the trunk 12. However, during the first 10 us or so the current on trunk 13 will drop below the low current reference. As a result the first comparator 44 will output a signal to open the series element 18 to isolate the trunk 13. However, as soon as the output of the second comparator 45 of the first trunk section 40 changes, this is detected by the corresponding third comparator 47, and it drives the override function 49 of the second trunk section 41. This overrides the signal to the series element 18, and it closes again. The current on trunk 13 then rises up to the full circuit current, twice its previous level. This sequence of events will be the same in the opposite direction if a short circuit occurred on trunk 13. In each case, the dominant short circuit reaction overrides the apparent open circuit reaction.

This all occurs quickly enough to prevent device brown out from occurring on any devices powered by the circuit.

The isolation of the trunk 12 is held for the first pre-determined time period by the delay function 51, which prevents a sequence of isolation and reconnection if the short circuit is an intermittent fault. At the end of the first pre-determined time period, the drive to the series element 17 is removed, and the trunk 12 is reconnected again. If the fault persists, the trunk 12 will be isolated again in the same way.

If a genuine open circuit occurs on trunk 12 the current thereon will drop, and as a result the first comparator 43 will output a signal to open the series element 17 to isolate the trunk 12. As the current drops on trunk 12, it rises on trunk 13, until trunk 13 handles the total circuit current. The isolation of the trunk 12 is held for the first pre-determined time period by the override function 49, which prevents a sequence of isolation and reconnection if the open circuit is an intermittent fault. At the end of the first pre-determined time period, the drive to the series element 17 is removed, and the trunk 12 is reconnected again. This sequence of events will be the same in the opposite direction if a genuine open circuit occurred on trunk 13.

In the event of an increase in current in both the first and second trunks 12 and 13 which reaches the high current reference at the same time, the output of both third comparators 47 is fed to the AND gate 42, and the output of the AND gate 42 activates both override functions 51. As such, neither of the first and second trunks 12 and 13 is isolated. The second override function 51 works by driving, at 52, the high current reference 46 fed to the second comparator 45 upwards to a higher point, to allow for the increased current. This feedback path is indicated by hashed box 50. This increase is performed for a pre-determined time only, for example 500 us, to allow for inrush current to occur. If the current remained high on both trunks after this period, there would be a problem and isolation would be required.

If an open circuit were to occur on both trunks, that could only indicate a simultaneous cable break on both trunks, a break at some common point in the circuit, or the disconnection of a load. In any of these events both trunks are isolated by the control means 14, and there would be no issues associated with that.

Figure 5A:
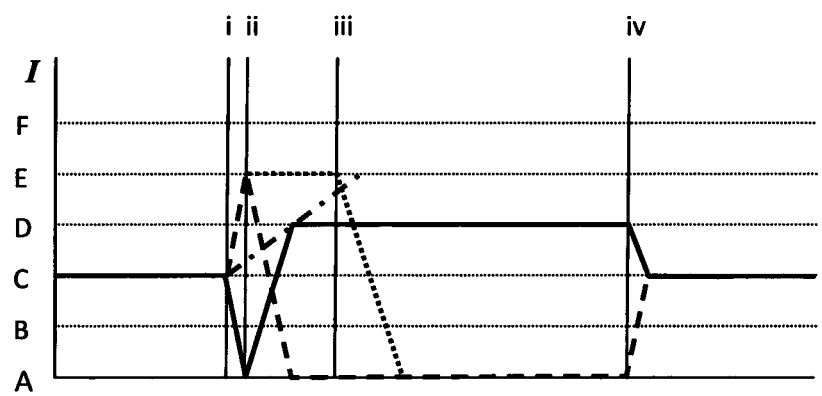
FIGS. 5a to 5c are graphs illustrating the reaction of the electrical circuit as shown in FIG. 3 to a number of events.
Figure 5B:
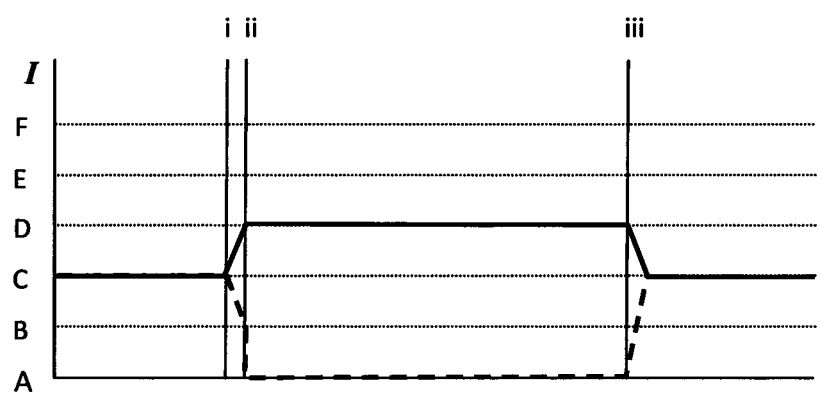
Figure 5C:
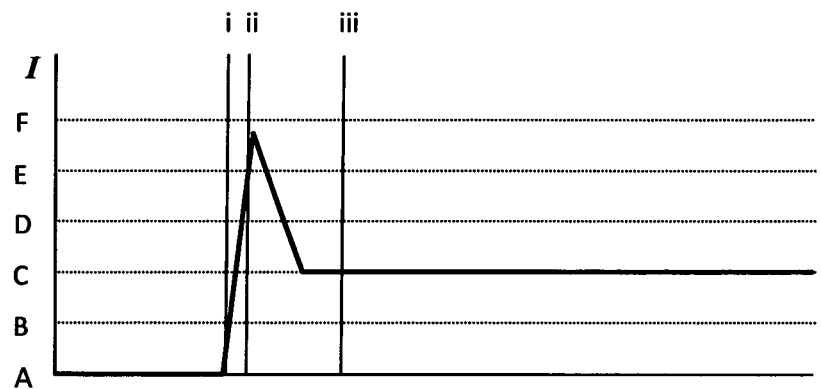

FIGS. 5a to 5c are graphs which illustrate the manner in which the circuit operates in the event of short circuits, open circuits and load connections as described above, and they help to explain some of the more detailed issues involved.

The graph shows current levels over time, and on the vertical axis a number of current levels are illustrated. A is 0 current, B a low current level trip value, C half the total load current (the current on each of the two trunks 12 and 13), D the total circuit current, E a high current trip value, and F a power supply high current trip value. The current in each trunk 12 and 13 is shown as hashed and solid lines and respectively. The graphs in FIGS. 5a to 5c are not to scale, and the low current trip level B and high current trip level E are shown as being fixed for ease of explanation.

Referring to FIG. 5a, at the beginning of the graph the current in each trunk is approximately the same. However, a short circuit occurs in trunk 12 at point i. The current in trunk 12 therefore increases up to the high current trip value E.

One problem with detecting the short circuit on trunk 12 is that the high current trip value E must be above the total current D, and as such there is a time delay before the increase in the current 40 can be detected. In addition, a normal increase in trunk current (ie without any reservoir effect) caused by a short circuit is only a relatively gradual increase over time, which is illustrated in FIG. 5a with a dotted and hashed line. In this case the difference between half the total load current C and the high current trip value E is such that it would take about 500 us for the current to reach the high current trip value E, as illustrated by the dotted and hashed line, and this is too long to prevent device brown out.

However, as is clear from FIG. 5a, the current in trunk 12 actually increases far faster than this as a result of the current fed to the short circuit by the terminator 20 and the reservoir 26. The precise manner in which the current in trunk 12 increases is dependent on a number of very complex factors, including the short circuit resistance (which includes the trunk cable resistance), and the characteristics of the terminator 20 (plus any other capacitive components e.g. filter capacitors). During the short circuit there is an exponential fall in current from the terminator, typically U/100 Ohms falling at a time constant of approximately 100 us, with a peak of U/100, until it reaches the initial current plus an exponential increase caused by the charging of the power conditioner's inductors.

As is clear from FIG. 5a, when the short circuit occurs on trunk 12 at point i, the current on trunk 13 drops as if there were an open circuit thereon. (FIG. 5b described below shows a genuine open circuit occurring on trunk 12, and the current drops in the same way as the current on trunk 13 does in FIG. 5a). As is clear from FIG. 5a, the current on trunk 13 drops below the low current trip value B before the current on trunk 12 reaches the high current trip value E. In practice the current on trunk 13 may or may not drop this quickly, according to various factors. However, whether trunk 13 is isolated before the current on trunk 12 reaches the high current trip value is moot at that time, because the drop in current caused by the short circuit has the same power starving effect on devices connected to the circuit.

It is important that the current on trunk 13 does not remain at such a low level for a long period of time, for example several hundred microseconds, because this could lead to device brown out or black out. However, this is prevented because the control means 14 is able to detect the short circuit on trunk 12 fast enough to drive both the series element 17 and the override function 49. This occurs at point ii, which is about 10 us after the short circuit at point i. As such, any isolation of the trunk 13 is prevented from occurring, either at all, or for more than a few micro seconds. If the current on trunk 13 never reaches the low current trip value B, prior to point ii, the isolating of trunk 12 will actually result in the current on trunk 13 rising back up again. If the current on trunk 13 did reach the low current trip value B, then the override function resolves the situation. Whatever happens, the current on trunk 13 then rises up to the total current level D.

The first pre-determined time period elapses at point iv, and the series element 17 is closed once again. In FIG. 5a the short circuit which occurred at point i has cleared, and the current on both trunks 12 and 13 returns to half the total load current C. If the short circuit remained, then trunk 12 would be isolated once again, for a further first pre-determined time period.

FIG. 5a also illustrates another possible feature of the arrangement shown in FIG. 4, which is optional. As an alternative to immediate isolation of the trunk 12 upon the detection of a short circuit, the second comparator 45 can be adapted to rectangularly limit the current on the trunk 12 instead. This might be required if the circuit has a lockout which would shut it down if the current in trunk 12 dropped to zero during a particular time frame. The duration of the current limitation, and the level that the current is limited to, can be set accordingly. It might be appropriate to apply a trickle current hold, but as an alternative a dotted line in FIG. 5a illustrates the current in trunk 12 being limited at the high current trip value D until point iii, when the trunk 12 is fully isolated. This functionality can by controlled by the delay function 51 described above.

Referring to FIG. 5b, at the beginning of the graph the current in each trunk 12 and 13 is approximately the same. However, an open circuit occurs in trunk 12 at point i. The current in trunk 12 therefore drops down to the low current trip value B. As soon as this happens it is detected by the first comparator 43, and the series element is opened for the first pre-determined time period. This occurs at point ii in FIG. 5b, and the current in trunk 12 drops down to zero.

The current in trunk 13 begins to increase as soon as the current in trunk 12 begins to drop. The current in trunk 13 rises up to the total circuit current D, and remains there while trunk 12 is isolated.

The first pre-determined time period elapses at point iii, and the series element 17 is closed once again. In FIG. 5b the open circuit which occurred at point i has cleared, and the current on both trunks 12 and 13 returns to half the total load current C. If the open circuit remained, then trunk 12 would be isolated once again, for a further first pre-determined time period.

Referring to FIG. 5c, at the beginning of the graph the current in each trunk 12 and 13 is zero. However, a load is attached at point i, and immediately demands a high inrush current. As such the current on both trunks 12 and 13 reaches the high current trip value E at point ii. However, as this occurs simultaneously, the outputs of the second comparators 45 to open the series elements 17 are overridden by the output of the AND gate 42. As such, no isolation of trunks 12 and 13 occurs. The duration of the override function 51 only lasts about 500 us, until point iii. However, as is clear from FIG. 5c, by this time the current on both trunks 12 and 13 has dropped back down to half the total load current C. The override has to be this short to minimize the risk of missing a genuine short circuit occurring elsewhere in the circuit.

Whenever the series elements 17 or 18 are opened as described above, the trunks 12 and 13 are isolated at both ends, due to the action of the diodes 27 and 28. This prevents there being any lengths of un-terminated cable attached to the circuit which could cause communications problems.

As the circuit described above has first and second trunks 12 and 13 electrically connected in parallel, the current in both the high and low lines of both trunks 12 and 13 has to be measured. It is possible to directly sense the current in both the high and low lines of the first and second trunk 12 and 13, however FIG. 6 illustrates how in the circuit described above the current in both the high and low lines is detected by just one sensor in the low line.

Figure 6:
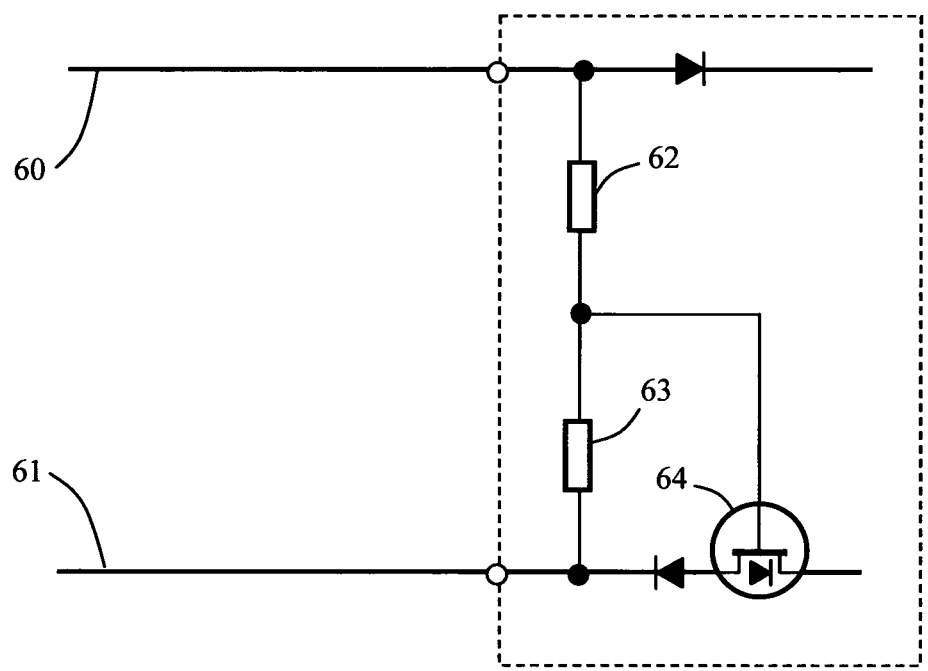
FIG. 6 is a diagrammatic view of part of the electrical circuit as shown in FIG. 3.

In FIG. 6 the high line 60 and the low line 61 are connected by a low voltage drop-out circuit, 62, 63 and 64, such that if a cut occurs in the high line 60, the drop-out circuit isolates the low line 61 to present an open circuit thereon, which is then detectable upstream in the low line 61.

Figure 7:
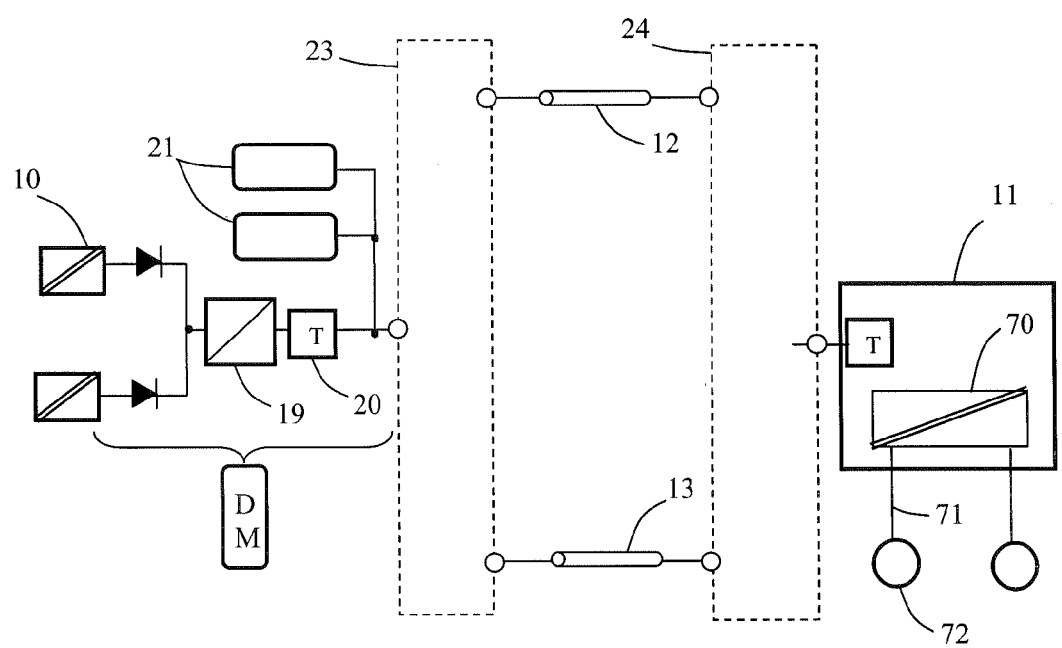
FIG. 7 is a diagrammatic view of the electrical circuit as shown in FIG. 3 in a particular configuration.

FIG. 7 shows how the coupler 11 can be provided with a repeater 70, spurs 71 and devices 72. The advantage of having a repeater is that the first and second trunks 12 and 13 can take up the full Fieldbus cable length limits, allowing for spur number and length independence. For example, each spur can be 120 meters in length, and the trunks 12 and 13 can be 1,900 meters or more in length.

Figure 8:
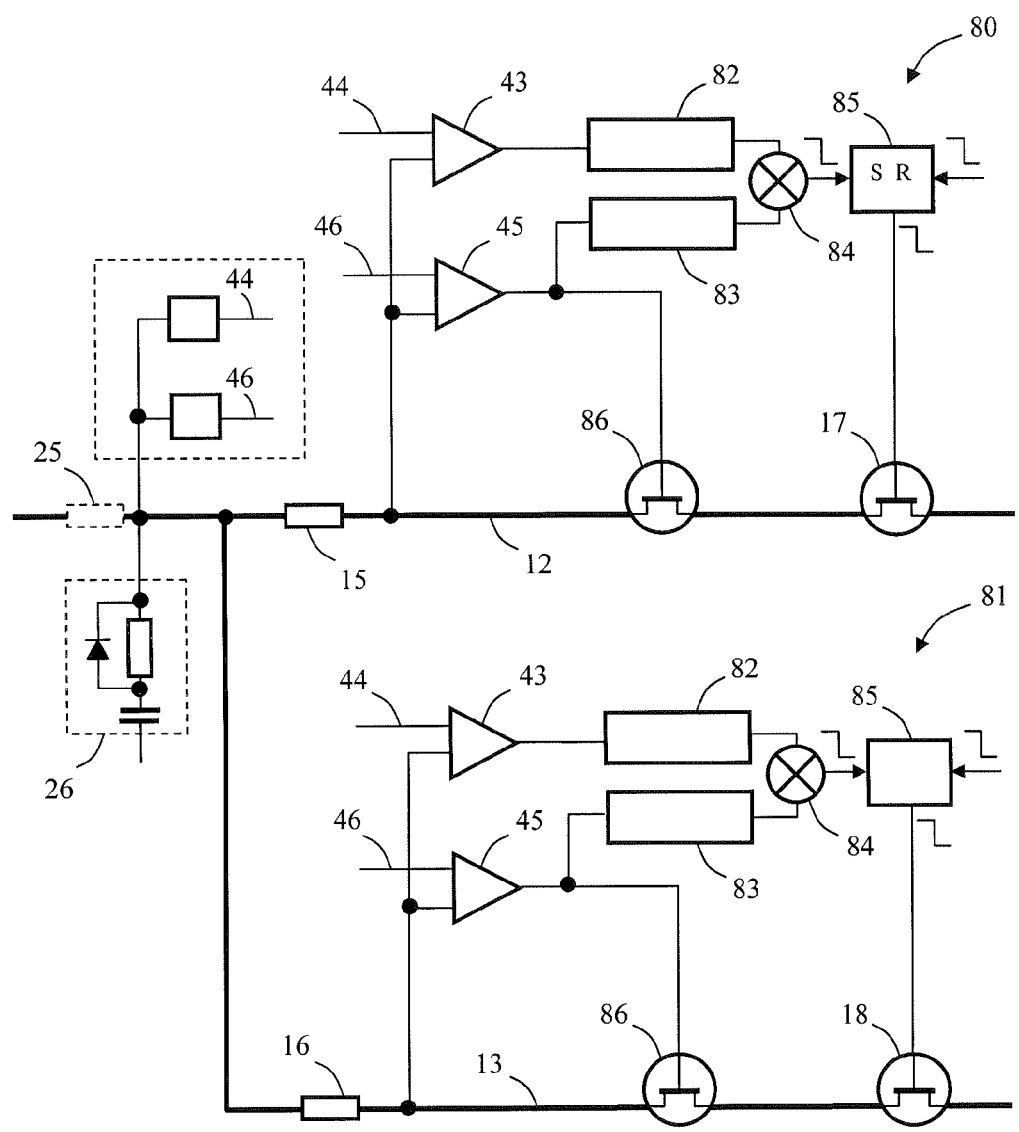
FIG. 8 is a diagrammatic view of a part of a second electrical circuit according to the present invention.

As referred to above, it is also possible for the control means 14 to operate with autonomous first and second trunk sections, and such an alternative arrangement is shown in FIG. 8. (Some of the devices used in FIG. 8 are the same as those described above, and where this is the case the same reference numerals have been used.)

In FIG. 8 the control means 14 comprises a first autonomous trunk section 80 and a second autonomous trunk section 81, each of which comprises the first comparator 43 provided with the real-time adaptive low current reference 44, and the second comparator 45 provided with the real-time adaptive high current reference 46. The outputs of the comparators 43 and 45 drive the series elements 17 and 18 open in the event of short and open circuits, as in the circuit in FIG. 4.

However, the first comparator 43 is provided with a 25 us delay function 82, adapted to prevent it from driving the series element 17 or 18 open for that period of time. In addition, the second comparator is provided with a 500 us delay function 83, adapted to prevent it from driving the series element 17 or 18 open for that period of time. The outputs of these delay functions 82 and 83 are fed to an OR gate 84, an output of which drives the series element 17 or 18. A delay function 85 is provided to hold the series element 17 or 18 open for a first pre-determined time period, in the same manner as functions 49 and 51 described above in relation to the circuit in FIG. 4.

In addition to this, the output of the second comparator 45 is also fed to a short term current limiter 86, which acts to limit the current on the trunks 12 and 13 during the 500 us delay period referred to above, to a level equivalent to the high current reference 46.

As with the circuit shown in FIG. 4, only the low line of the trunks 12 and 13 is monitored, but there is means to open the low line in the event of an open circuit occurring on the high line, so that action can be taken. In addition, there are also slave isolation devices at the load end of the trunks 12 and 13. However, in this instance these features are provided in a slightly different way to as described above.

Figure 9:
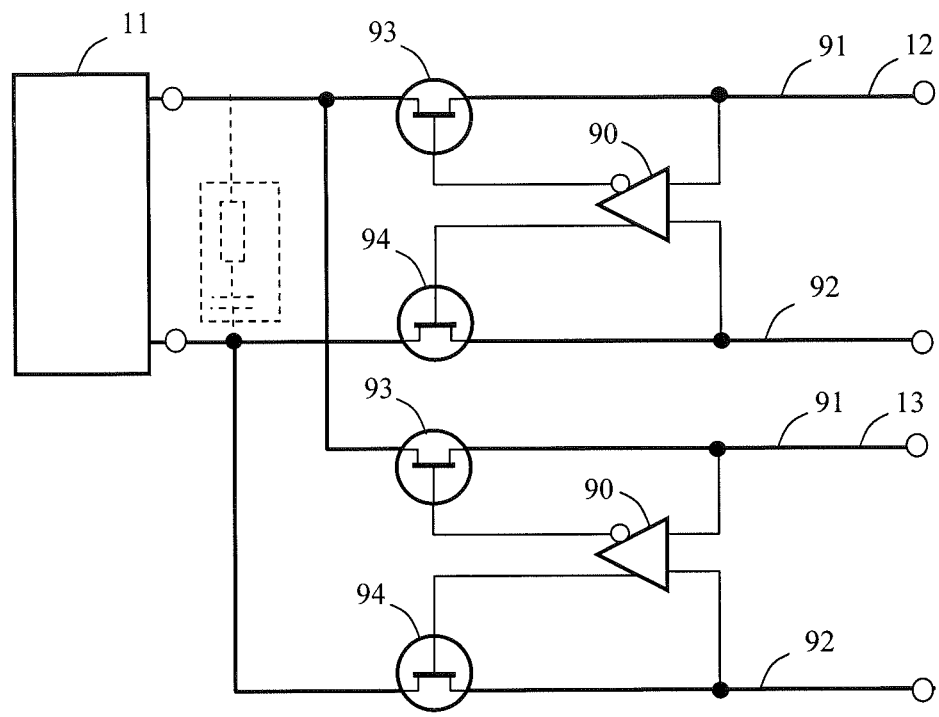
FIG. 9 is a diagrammatic view of a part of the second electrical circuit, part of which is shown in FIG. 8.

In particular, FIG. 9 shows the load end of the trunks 12 and 13, and in each case an OR diode 90 is mounted between the high and low lines 91 and 92. Outputs of the OR diode 90 are connected to series elements 93 and 94 disposed on the high and low lines 91 and 92 respectively.

With this arrangement, in the event of an open circuit in the high line 91, the collapse in the voltage is detected by the OR diode 90, which then drives both the series elements 93 and 94 to isolate both the high and low lines 91 and 92. The isolation of the low line 92 is then detectable by the resistor 15 or 16.

In addition, in the event of isolation being instigated at the power supply end of either trunk 12 or 13, this will also result in a voltage collapse which is detectable by the OR diode 90, and both lines 91 and 92 of the trunk 12 or 13 are opened, to isolate the load end of the trunk 12 or 13.

This arrangement assumes a "slave" functionality, because it simply opens the series elements 93 and 94 if there is a fault and closes them if there is not. Therefore, if an open circuit fault lasts for less than 25 us, ie before the power supply end is isolated, then this arrangement will only isolate the load end of the trunk 12 or 13 for the duration of the fault. The isolation therefor has no effect on the circuit beyond that already caused by the fault itself. However, if isolation in instigated at the power supply end of the trunk 12 or 13, this arrangement will isolate the load end for the duration of the master power supply end isolation action.

The topology shown in FIG. 9 can be formed as a 'two into one' connection for the coupler 11, or it can use the trunk in and trunk out connections on the coupler 11, with the internal link completing the circuit. The latter is preferred because this reduces common field cable/termination fault potential.

Therefore, if a short circuit occurs on trunk 12 the current thereon will increase immediately, according to the capacity of the terminator 25 and the reservoir 26. Within the first 10 us or so the current will reach the high current reference 46, and as a result the second comparator 45 will output a signal. This signal is directed without delay to the current limiter 86, and as such the current on the trunk 12 is limited. The signal is also directed to the series element 17, but via the 500 us delay function 83. As such, the current on trunk 12 will be limited to the high current reference point for 500 us, before the trunk 12 is then fully isolated.

However, as before, during the first 10 us or so the current on trunk 13 will drop below the low current reference 44. As a result the first comparator 43 in section 81 will output a signal to open the series element 18 to isolate the trunk 13. However, this signal is subjected to the 25 us delay. As described above, by about 10 us the current on the first trunk 12 is capped, and this results in the stabilisation of the current on trunk 13. As such, within this 25 us period the current on trunk 13 will rise back up above the low current reference 44, and the signal from the first comparator 43 will cease. As such, trunk 13 will not be isolated as a result of the apparent open circuit thereon, and the current will then continue to rise up to the total circuit level. It will reach this level within 500 us, and as such full circuit current is available when the first trunk 12 is eventually isolated. The stabilisation of the current on trunk 13 is quick enough to prevent device brown out. This sequence of events will be the same in the opposite direction if a short circuit occurred on trunk 13.

The isolation of the trunk 12 is held for the first pre-determined time period by the delay function 85, which prevents a sequence of isolation and reconnection if the short circuit is an intermittent fault. At the end of the first pre-determined time period, the drive to the series element 17 is removed, and the trunk 12 is reconnected again. If the fault persists, the trunk 12 will be isolated again in the same way as described above.

If a genuine open circuit occurs on trunk 12 the current thereon will drop, and as a result the first comparator 43 will output a signal to open the series element 17 to isolate the trunk 12, which will get through after the 25 us delay. However, within this 25 us period the current on trunk 13 will rise up to the total circuit current, so the delay has no disadvantage. Again, the isolation of the trunk 12 is held for the first pre-determined time period by the delay function 85, which prevents a sequence of isolation and reconnection if the open circuit is an intermittent fault. At the end of the first pre-determined time period, the drive to the series element 17 is removed, and the trunk 12 is reconnected again. This sequence of events will be the same in the opposite direction if a genuine open circuit occurred on trunk 13.

In the event of an increase in current in both the first and second trunks 12 and 13, caused by the connection of a load and the immediate demand for inrush current, the current on the trunks 12 and 13 will reach the high current reference 46 at the same time. When this happens the second comparators 45 output a signal to drive the series elements 17 and 18 open, but this is subjected to the 500 us delay. As referred to above, the inrush current phenomenon elapses within 500 us, and as such the current on the first and second trunks 12 and 13 drops back down below the high current reference 46 within this period, and the drive to the series elements 17 and 18 ceases. If the current remained high on both trunks 12 and 13 after this 500 us period, there would be a problem and isolation would be required, and would occur.

It will be appreciated that during this 500 us delay the current on both trunks 12 and 13 is limited to the high current reference 46 by the short term current limiters 86. This is to prevent the current on either trunk 12 or 13 from increasing to such an extent that it exceeds a power supply high current trip point. This is a possibility in practice, and it would lead to shut down of the whole circuit. Therefore, this current limiting feature is necessary as a result of the 500 us delay feature.

If an open circuit were to occur on both trunks, that could only indicate a simultaneous cable break on both trunks, a break at some common point in the circuit, or the disconnection of a load. In any of these events both trunks would be isolated after the 25 us delay, and there would be no issues associated with that.

Whenever the series elements 17 or 18 are opened as described above, the trunks 12 and 13 are isolated at both ends, due to the action of the OR diodes 90. This prevents there being any lengths of un-terminated cable attached to the circuit which could cause communications problems.

One advantage of the circuit in FIG. 8 is that if one of the first and second trunks 12 or 13 is isolated because of a fault, the connection of a load and subsequent demand for inrush current higher than the high current reference 46 on the one healthy trunk 12 or 13 will not result in isolation of that trunk, because of the autonomous 500 us delay feature. This is not the case for the circuit shown in FIG. 4, because no override signal would be received to prevent isolation of the healthy trunk in these circumstances, because the faulty trunk is isolated at the time.

Another advantage of the circuit in FIG. 8, is that the 500 us delay before isolating a trunk if a short circuit occurs thereon allows a period for the device coupler 11 and field side terminator 22 to charge. This is not possible with the circuit shown in FIG. 4 when the faulty trunk is isolated in about 10 us, although it is possible if there is a period of current limiting.

Figure 10A:
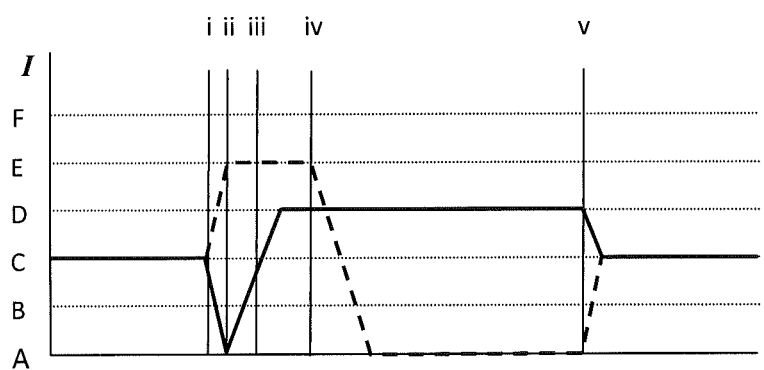
FIGS. 10a to 10c are graphs illustrating the reaction of the electrical circuit, part of which is shown in FIG. 8, to a number of events.
Figure 10B:
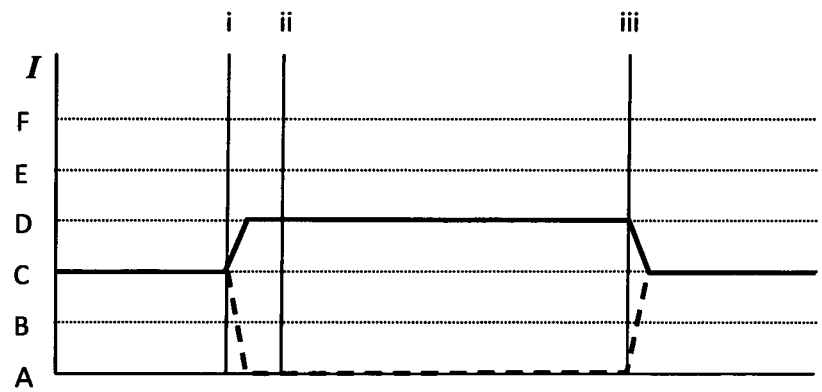
Figure 10C:
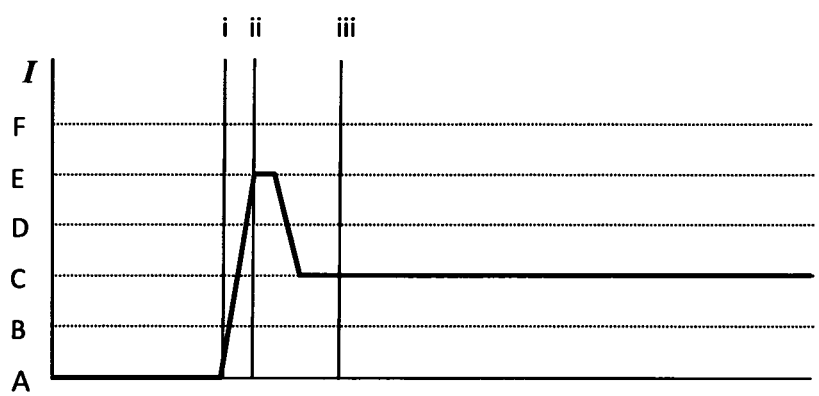

FIGS. 10a to 10c are graphs which illustrate the manner in which the circuit shown in FIG. 8 operates in the event of short circuits, open circuits and load connections as described above.

As with the graphs shown in FIGS. 5a to 5c, the graphs in FIGS. 10a to 10c show current levels over time, and on the vertical axis a number of current levels are illustrated. A is 0 current, B a low current level trip value, C half the total load current (the current on each of the two trunks 12 and 13), D the total circuit current, E a high current trip value, and F a power supply high current trip value. The current in each trunk 12 and 13 is shown as hashed and solid lines respectively. The graphs in FIGS. 10a to 10c are not to scale, and the low current trip level B and high current trip level E are shown as being fixed for ease of explanation.

Referring to FIG. 10a, at the beginning of the graph the current in each trunk 12 and 13 is approximately the same. However, a short circuit occurs in trunk 12 at point i. The current in trunk 12 therefore increases up to the high current trip value E at point ii, which occurs after about 10 us seconds. As soon as it reaches this point, the second comparator 45 outputs a signal to the short term current limiter 86, and the current on trunk 12 is limited to that level. This occurs until the end of the 500 us delay at point iv, at which point the output from the second comparator is fed to the series element 17, and the trunk 12 is fully isolated. The current thereon then drops to zero.

As is clear from FIG. 10a, when the short circuit occurs on trunk 12 at point i, the current on trunk 13 drops as if there were an open circuit thereon, and it dips below the low current trip value B before the current on trunk 12 reaches the high current trip value E. Therefore, the first comparator 43 of section 81 begins to output a signal to the series element 18.

However, as a result of the current limit applied to trunk 12 at point ii, the current on trunk 13 begins to rise, and it exceeds the low current trip value B prior to the end of the 25 us delay 82, which occurs at point iii. Therefore, the output of the first comparator 43 ceases prior to the end of the 25 us delay 82, and as a result trunk 13 is not isolated.

In practice the current on trunk 13 may or may not drop this quickly, according to various factors. However, trunk 13 cannot be isolated within the 25 us delay period, so provided the current on trunk 12 is capped quickly enough, the current on trunk 13 will always recover in time. The circuit shown in FIGS. 8 and 9 can act at this speed, and device brown out is therefore avoided.

Whatever happens, the current on trunk 13 rises up to the total current level D. The first pre-determined time period then elapses at point v, and the series element 17 is closed once again. In FIG. 10a the short circuit which occurred at point i has cleared, and the current on both trunks 12 and 13 returns to half the total load current C. If the short circuit remained, then trunk 12 would be isolated once again, for a further first pre-determined time period.

Referring to FIG. 10b, at the beginning of the graph the current in each trunk 12 and 13 is approximately the same. However, an open circuit occurs in trunk 12 at point i. The current in trunk 12 therefore drops down to the low current trip value B. As soon as this happens it is detected by the first comparator 43, and a signal is sent to the series element 17. However, this signal is subjected to the 25 us delay 82, so no isolation action occurs until this has elapsed, at point ii. At that point the series element 17 is opened for the first pre-determined time period.

The current in trunk 13 begins to increase as soon as the current in trunk 12 begins to drop. The current in trunk 13 rises up to the total circuit current D, and remains there while trunk 12 is isolated.

The first pre-determined time period elapses at point iii, and the series element 17 is closed once again. In FIG. 10b the open circuit which occurred at point i has cleared, and the current on both trunks 12 and 13 returns to half the total load current C. If the open circuit remained, then trunk 12 would be isolated once again, for a further first pre-determined time period.

Referring to FIG. 10c, at the beginning of the graph the current in each trunk 12 and 13 is zero. However, a load is attached at point i, and immediately demands a high inrush current. As such the current on both trunks 12 and 13 reaches the high current trip value E at point ii. As such, signals are output from both of the second comparators 45 to drive the series elements 17 and 18 open. However, this signal is subjected to the 500 us delay 83, so no isolation occurs within this period. As is clear from FIG. 10c, prior to the end of the 500 us period at point iii, the current in both trunks 12 and 13 drops back down to half the total load current C, and as such the drive the series elements 17 and 18 ceases, and no isolation occurs.

When the current on both trunks 12 and 13 reaches the high current trip value at E at point ii, the output of both second comparators 45 is fed without delay to the short term current limiters 86. As such, the current on the trunks 12 and 13 is capped at the high current trip value E, and is prevented from reaching the power supply high current trip value F. This is important, because if the current did reach that point, the whole circuit would be shut down.

One of the clear advantages of the present invention over the prior art described above, is that the redundancy of the trunks 12 and 13 is entirely independent of the power supplies 10 and the host systems 21. As such, the power supply 10 and the host systems 21 can benefit from their own entirely autonomous redundancy arrangements. Such redundant power supplies and host systems are known, and a particular advantage of the present invention, is that it can be used with any of these known arrangements.

Figure 11:
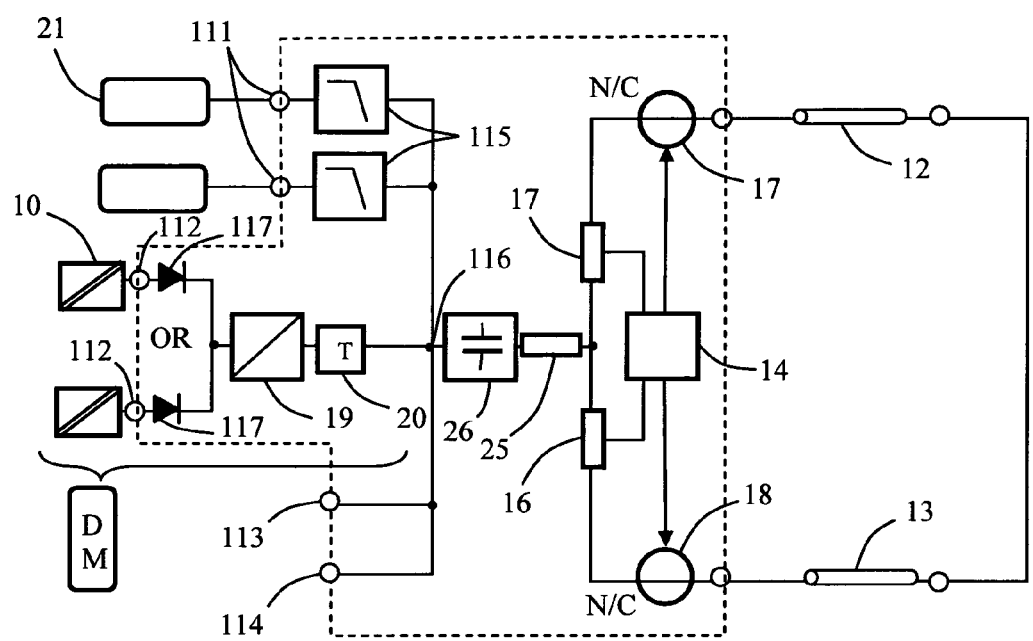
FIG. 11 is a diagrammatic view of a third electrical circuit according to the present invention.

In order to facilitate this, the power supply end circuit (23 in FIG. 4) can be provided with a number of possible power supply and host system connection points, and such an arrangement is shown in FIG. 11. (Some of the components in the circuit shown in FIG. 11 are the same as those in the circuit shown in FIG. 4, and where this is the case the same reference numerals have been used.)

In FIG. 11 the power supply end circuit 110 is similar to power supply end circuit 23 shown in FIG. 4, except that it now has redundant host connectors 111, redundant power supply connectors 112, simplex host connector 113 and simplex power supply connector 114.

The redundant host connectors 111 are segregated, and protected by independent short circuit protectors 115. The routing is then directly joined to a common point 116, which is an infallible hard wired pcb track, for safety.

The redundant power supply connectors 112 are also discreet, and are fed via OR diodes 117 to the same common point 116. In this instance there is provided a common power conditioner 19 and terminator 20; the power supplies 10 in this case being unconditioned non Fieldbus power supplies, but with an adequate specification, and with adequate galvanic isolation for Fieldbus use. (The power conditioner 19 can be omitted if the power supplies 10 were fitted with active power conditioners.)

The simplex host and power supply connectors 113 and 114 also feed into the same common point 116, and provide for connections to host systems and power supplies with only one connection, which could be simplex or they could be autonomously redundant but have only one output.

The above described embodiments can be altered without departing from the scope of Claim 1. For example, in one alternative embodiment (not shown) an electrical circuit according to the invention is provided which is purely a power supply circuit, which does not comprise any communications.

In alternative embodiments (not shown) the control means is facilitated by electronic circuitry programmed to perform the functions illustrated in the embodiments described above.

Therefore, the present invention provides an electrical circuit with truly redundant trunks, which overcomes all the disadvantages associated with prior art arrangements. In particular, the electrical circuit of the present invention is able to detect a genuine fault and isolate it fast enough to prevent device brown out or black out. It is also able to fully isolate the trunks at both ends to prevent communications problems, and hold any isolation to prevent intermittent faults disrupting the system. The isolation also takes place on both the high and low lines of the trunks.

The electrical circuit of the present invention can also use simplex fixed terminators, which is a much better arrangement than in the prior art. Further, in the electrical circuit of the present invention trunk redundancy is segregated from any power supply or host redundancy, which is particularly advantageous over the prior art. This common point between the various redundant systems also allows for physical layer diagnostics to be applied to both working trunks simultaneously. In the prior art there is often an unmonitored trunk.

From a safety point of view, the electrical circuit of the present invention is also advantageous, because while incendive arc prevention is not the principal aim of the invention, the fact that the trunks are isolated so quickly, and that intermittent faults are dealt with, significantly reduces the risk of any incendive arcs occurring. In addition, as there are two trunks sharing the power supply, the potential energy for each fault is halved.

The invention claimed is:

1. An electrical circuit comprising a power supply, a load, first and second trunks disposed therebetween and a control circuit which controls the electrical status of the first and second trunks,
    in which the control circuit comprises a first current sensor disposed on the first trunk and a second current sensor disposed on the second trunk which monitor the current of the first and second trunks respectively and detect current events which are indicative of faults occurring thereon, and an isolation device which isolates the first or second trunk when the first current sensor or the second current sensor respectively detects a current event which is indicative of a fault occurring thereon,
    in which the first and second trunks are electrically connected and arranged in parallel such that the power supplied to the load is distributed substantially equally between them,
    in which the control circuit is adapted to drive the isolation device to isolate the first or second trunk if the corresponding first or second current sensor detects a current below a low current trip value or above a high current trip value, said low current trip value and said high current trip value being respectively below and above an expected minimum and maximum working current of the load
    in which the control circuit comprises a compensation circuit which prevents the control circuit from driving the isolation device to isolate said first trunk when the current thereon reaches said low current trip value as a result of a short circuit on said second trunk, and in which the compensation circuit also prevents the control circuit from driving the isolation device to isolate said second trunk when the current thereon reaches said low current trip value as a result of a short circuit on said first trunk.

2. An electrical circuit as claimed in claim 1 in which said circuitry comprises a first autonomous trunk section and a second autonomous trunk section, each of which comprises a first comparator adapted to compare the current detected by the corresponding current sensor with a low current reference, and a second comparator adapted to compare the current detected by the corresponding current sensor with a high current reference, in which the first and second comparators are adapted to drive the isolation device to isolate the first or second trunk if the corresponding current sensor detects a current below or above said low current reference and high current reference respectively, and in which the first comparator is provided with a first delay means adapted to prevent the first comparator from driving the isolation device to isolate the corresponding trunk for a first pre-determined delay period.

3. An electrical circuit as claimed in claim 2 in which the second comparator is provided with a second delay means adapted to prevent the second comparator from driving the isolation device to isolate the corresponding trunk for a second pre-determined delay period, in which the control circuit comprises current limiting means adapted to limit the current on the first or second trunk, and in which the second comparator is adapted to drive the current limiting means to limit the current on the corresponding trunk during said second pre-determined delay period.

4. An electrical circuit as claimed in claim 1 in which said circuitry comprises a first trunk section and a second trunk section, each of which comprises a first comparator adapted to compare the current detected by the corresponding current sensor with a low current reference, a second comparator adapted to compare the current detected by the corresponding current sensor with a high current reference, and a third comparator adapted to compare the output of the second comparator with a fixed reference, in which the first and second comparators are adapted to drive the corresponding isolation device to isolate the first or second trunk if the corresponding current sensor detects a current below or above said low current reference and high current reference respectively, in which the first comparator is provided with a first override means, in which the third comparator of each of the first trunk section and the second trunk section is adapted to drive the first override means of the other of the first trunk section and the second trunk section if the output of the corresponding second comparator changes.

5. An electrical circuit as claimed in claim 4 in which outputs of the third comparator of both the first trunk section and the second trunk section are fed to an AND gate, in which the second comparator is provided with a second override means, and in which the AND gate is adapted to drive the second override means of both the first trunk section and the second trunk section.

6. An electrical circuit as claimed in claim 1 in which the electrical circuit comprises current reservoir means, which in the event of short circuit on the first or second trunk is adapted to drive the current thereon to said high current trip value in less time than said current would reach said high current trip value in its absence.

7. An electrical circuit as claimed in claim 1 in which the control circuit is adapted to drive the isolation device to isolate the first or second trunk for a first pre-determined time period after the detected current on said first or second trunk reaches said low current trip value or said high current trip value.

8. An electrical circuit as claimed in claim 7 in which said electrical circuit is a communications circuit comprising telegrams sent between a host and one or more field devices connected to said electrical circuit, in which said field devices send telegrams to the host in a cycle sequence which lasts for a second pre-determined time period, in which said first pre-determined time period is at least twice the length of the second pre-determined time period.

9. An electrical circuit as claimed in claim 8 in which the control circuit comprises a manual reconnection, in which during said first pre-determined time period manual activation of the manual reconnection reconnects said first or second trunk.

10. An electrical circuit as claimed in claim 9 in which the control circuit reconnects said first or second trunk after said first pre-determined time period.

11. An electrical circuit as claimed in claim 1 in which said first and second trunks comprise a power supply end and a load end, in which the isolation device comprises primary isolation devices disposed at the power supply ends of the first and second trunks, and in which the isolation device further comprises slave isolation devices disposed at the load ends of the first and second trunks.

12. An electrical circuit as claimed in claim 11 in which the primary isolation devices each comprise a resistive series element adapted to isolate the corresponding trunk from the power supply, and in which the slave isolation devices each comprise a diode adapted to isolate the corresponding trunk from the load when the corresponding primary isolation device isolates said trunk from the power supply.

13. An electrical circuit as claimed in claim 1 in which the electrical circuit comprises a common power supply end section and a common load end section, in which a fixed passive terminator is provided in said common power supply end section and in said load end section.

14. An electrical circuit a claimed in claim 13 in which the monitoring means further comprises a third current sensor disposed in the common power supply end section, which third current sensor is adapted to detect a total current in the electrical circuit over time, in which the control means is adapted to derive the low current trip value and the high current trip value as functions of said detected total current, which functions track said total current over time.

15. An electrical circuit as claimed in claim 1 in which the first and second trunk each comprise a high line and a low line, in which the first and second current sensors are adapted to measure the current on both the high and low lines of the corresponding trunk.

16. An electrical circuit as claimed in claim 15 in which the high line and the low line are connected by a low voltage drop-out circuit, and in which the first and second current sensors are disposed on the corresponding low line.

17. An electrical circuit comprising a power supply, a load, first and second trunks disposed therebetween and control means adapted to control the electrical status of the first and second trunks, in which the control means comprises monitoring means adapted to monitor the current and/or voltage of the first and second trunks and to detect current and/or voltage events which are indicative of faults occurring thereon, and isolation means adapted to isolate the first or second trunk when the monitoring means detects a current and/or voltage event which is indicative of a fault occurring thereon, in which the first and second trunks are electrically connected and arranged in parallel such that the power supplied to the load is distributed substantially equally between them, and in which the control means comprises compensation means adapted to prevent the isolation means from isolating one of said first or second trunks when a current and/or voltage event which is indicative of a fault occurs thereon which is caused by a fault occurring on the other of the first or second trunks, in which the monitoring means comprises a first current sensor disposed on the first trunk and a second current sensor disposed on the second trunk, in which the control means comprises circuitry adapted to drive the isolation means to isolate the first or second trunk if the corresponding first or second current sensor detects a current below a low current trip value or above a high current trip value, said low current trip value and said high current trip value being respectively below and above an expected minimum and maximum working current of the load, and in which the compensation means comprises a first function of the circuitry which prevents said circuitry from driving the isolation means to isolate the first or second trunk if the current thereon reaches said low current trip value as a result of a short circuit on the other of the first or second trunk.

* * * * *